United States Patent [19]
Jensen

[11] Patent Number: 5,397,031
[45] Date of Patent: Mar. 14, 1995

[54] BABY MILK WARMER

[76] Inventor: Martin T. Jensen, 23263 Madero, Ste. B, Mission Viejo, Calif. 92691

[21] Appl. No.: 207,206

[22] Filed: Mar. 8, 1994

[51] Int. Cl.6 ............................................. B67D 5/62
[52] U.S. Cl. .................................. 222/146.5; 222/185
[58] Field of Search ............................. 222/146.5, 185

[56] References Cited

U.S. PATENT DOCUMENTS

| | | | |
|---|---|---|---|
| 959,110 | 5/1910 | Buck | 99/302 R |
| 2,191,918 | 2/1940 | Stadtfeld | 222/146.6 X |
| 2,813,699 | 6/1955 | Lipari | 215/11.1 |
| 3,143,636 | 8/1964 | Lupovici | 222/146.6 X |
| 3,178,557 | 4/1965 | Umann | 222/146.5 X |
| 3,247,360 | 4/1966 | Ponder | 219/436 |
| 3,420,414 | 1/1969 | Christine et al. | 222/146.5 |
| 3,589,559 | 6/1971 | Colton et al. | 222/146.5 X |
| 3,835,295 | 9/1974 | Ronchese | 222/146.5 X |
| 3,927,802 | 12/1975 | Lavochkin et al. | 222/146.5 X |
| 3,978,233 | 8/1976 | Bolt | 426/115 |
| 4,597,435 | 7/1986 | Fosco | 165/80.5 |
| 4,614,859 | 9/1986 | Beckering | 219/312 |
| 4,818,114 | 4/1989 | Ghavi | 366/130 |
| 4,858,155 | 8/1989 | Okawa | 364/557 |
| 4,878,588 | 11/1989 | Ephraim | 215/11.2 |
| 5,208,896 | 5/1993 | Katayev | 392/444 |

FOREIGN PATENT DOCUMENTS 1921600 11/1969 Germany ........................ 222/146.5

OTHER PUBLICATIONS

Undated Publication "Playskool Baby Easy Feedin Nightime Feeder".

Primary Examiner—Andres Kashnikow
Assistant Examiner—Kenneth Bomberg
Attorney, Agent, or Firm—Walter A. Hackler

[57] ABSTRACT

A baby milk warmer includes a housing for supporting a bottle of water and a heater for heating selected amounts of water. A flexible tube is provided for interconnecting the bottle and the heater and a metering valve is disposed between the bottle and the heater, allowing one of the selected amounts of water to enter the heater. A sensor is provided and disposed within the flexible tube upstream from the metering valve for sensing the temperature of water entering the metering valve. A control system, responsive to a manual switch for designating one of the selected amounts of water, is provided for running the heater for a sufficient time to warm one of the selected amounts of water to a selected temperature.

11 Claims, 1 Drawing Sheet

BABY MILK WARMER

The present invention generally relates to preparation of baby formulation and is more specifically directed to a device for preparing baby formulation at a temperature suitable for feeding "on demand".

A feeding schedule for a baby typically includes feeding intervals between a minimum of about three hours and a maximum of about four hours. The majority of babies generally adapt to this schedule within a few weeks.

Naturally, the schedule intervals may be shifted to those most convenient for the parents. However, no matter what the schedule, night-time feeding is mandated by the baby's needs.

Most parents find it most convenient to prepare enough formula for a full day's feeding simply because it is easier at late night or early morning hours to simply heat a prepared bottle to avoid the late night/early morning steps of boiling the bottles for sterilization and thereafter filling the bottles with formula.

However, even with a prepared formula, it can be very frustrating listening to a baby cry while waiting for the bottle to warm. Furthermore, the baby's room or crib is typically not conveniently located to the kitchen refrigerator and stove/microwave where the bottle is prepared for feeding.

The present invention provides a convenient baby milk warmer, which enables the preparation of formula at the baby's bedside. Thus, a parent responding to the baby's crying request for food can conveniently comfort and soothe the baby while simultaneously preparing the baby formula for use.

SUMMARY OF THE INVENTION

In accordance with the present invention, a baby milk warmer generally includes a housing for supporting a bottle of water and a heater which provides means for heating selected amounts of water. The heater includes inlet means for receiving water and outlet means for dispensing of heated water.

A flexible tube, provided and interconnected between the bottle and the end of the means and a metering valve, provides a means for allowing one of the selected amounts of water to enter the heating means.

A sensor disposed in the flexible tube provides a means for sensing the temperature of the water upstream from the metering valve and a manual switch is provided for designating one of the selected amounts of water to be dispensed.

Finally, a control system provides a means which is responsive to the sensor and the manual means for running the heating means for a sufficient time to warm one of the selected amounts of water to a selected temperature.

More particularly, the selected amounts of water may be 4 ounces, 6 ounces and 8 ounces, and the heater means is sized for heating the selected amounts of water to 98° in 15 seconds, 22-½ seconds and 30 seconds, respectively. Thus, the present invention provides for the preparation of baby formula in a matter of seconds as opposed to prior art devices requiring several minutes for preparation.

In combination with the hereinabove apparatus, the present invention further comprises a plurality of collapsible liners containing 4, 6 and 8 ounce quantities of baby milk powder and at least one plastic cylinder. The plastic cylinder is utilized to support one of the collapsible liners and includes a top and a nipple for enabling convenient use of the prepared formulation.

The manual means for selecting the amount of water may be an electrical switch and the heater may comprise a chamber with heating coils therein disposed for submersion in one of the selected amounts of water or a section of heated tube for enabling one of the selected amounts of water to flow therethrough.

Preferably, the body comprises a neck portion and the flexible tube comprises a coupling means for connection with the neck portion and the tube is of sufficient length to enable the coupling to be connected to the neck portion while the bottle is in an upright position, in order to enable the bottle to be inverted and disposed in the housing without spillage water.

BRIEF DESCRIPTION OF THE DRAWINGS

The advantages and features of the present invention will be better understood by the following description, when considered in conjunction with the accompanying drawings, in which.

DETAILED DESCRIPTION

Figure 1:
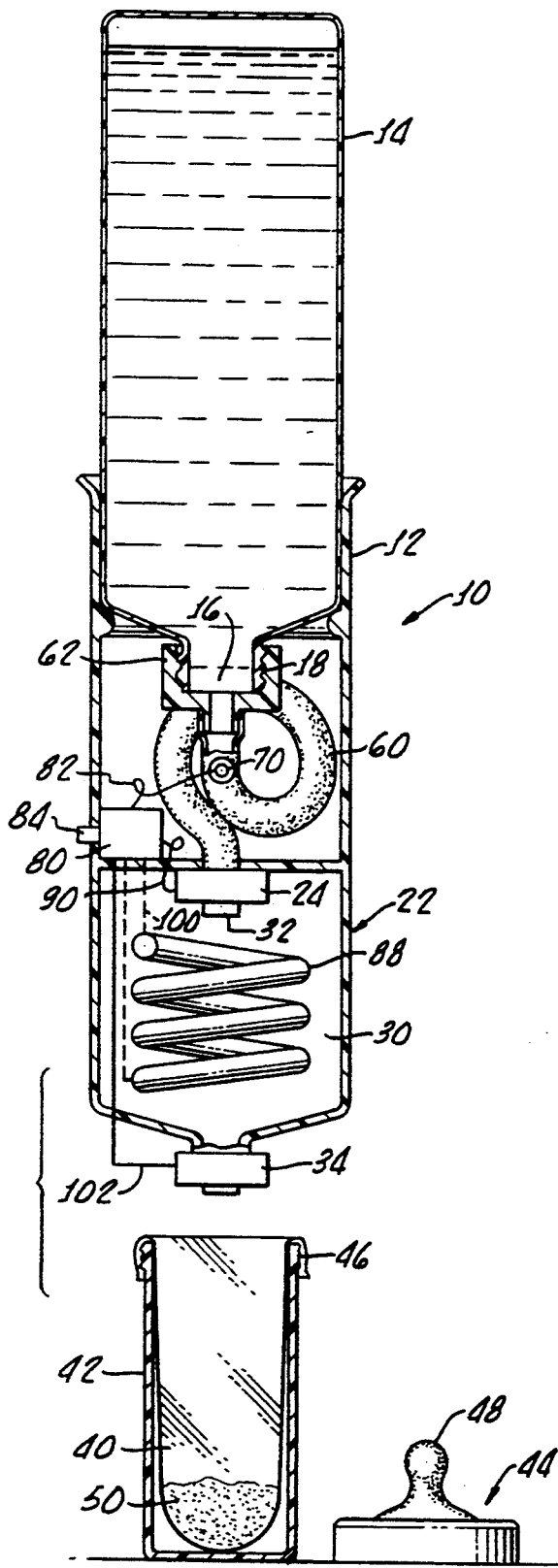
FIG. 1 is a diagram of the present invention, generally showing a housing for supporting a bottle, a heater and one of a plurality of liners with a selected amount of baby milk powder therein, along with a cap and nipple for the plastic cylinder supporting a liner.

Turning now to FIG. 1, there is shown a baby milk warmer 10, in accordance with the present invention, which generally includes a housing 12 for supporting a water bottle 14 in an inverted position. The water bottle may be of plastic and be of any convenient design, with a capacity of preferably about 32 ounces, and having a neck portion 16 with engageable threads 18 thereon.

A heater 22 provides means for heating selected amounts of water dispensed from the bottle 14 through a metering valve 24.

As shown in FIG. 1, the heater 22 may include a chamber 30 with an inlet 32 and discharge valve outlet 34 for receiving water and dispensing heated water, respectively.

Figure 2:
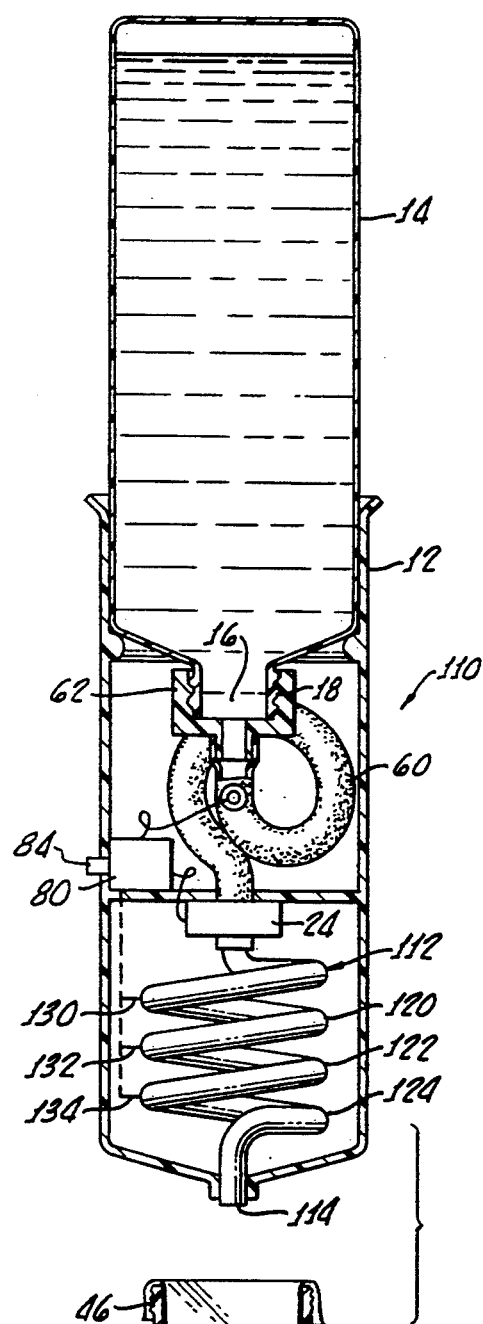
FIG. 2 is an alternative embodiment of the present invention showing a heater having a continuous coil for heating of water flowing therethrough.

While not part of the present invention and not shown in the accompanying drawings, the housing 12 may be supported in a position for enabling one of a plurality of liners 40, 43, see also FIG. 2, disposed within a plastic cylinder 42 beneath the discharge valve outlet 34.

In combination with the hereinabove described apparatus, there is also provided a cap 44, sized for engaging threads 46 on the cylinder 42 and a nipple 48 for dispensing of heated milk formulation.

The supplied liners 40, 43 may include different selected amounts of baby milk powder 50, 52, such as, for example, sufficient to make 4 ounce, 6 ounce and 8 ounce quantities of baby formula, with heated water dispensed from the discharge valve outlet 34. A flexible tube 60 is provided and interconnected between the metering valve 24 and the neck 16 of the bottle 14, by coupling 62, sized for engaging the threads 18.

Importantly, the flexible tube 60 is of sufficient length to enable the bottle 14 to be coupled with the tube 60 via the coupling 62, while in an upright position, not shown, and thereafter inverted into the housing 12 as shown in FIGS. 1 and 2.

A sensor 70 is disposed in the flexible tube 60 at a position upstream from the metering valve 24 for sensing the temperature of water entering the metering valve 24 and for providing a corresponding electrical signal which is received as a control system 80 via an electrical connection 82. The control system 80 may include any conventional microchip processor and appropriate input and output circuits, not shown.

A switch 84 provides a manual means for designating one of the selected amounts of water and the control system 80 is responsive to the electrical signal from the sensor 82 and the switch 84 for running the heater 22, which includes coils 88, for sufficient time to warm one of the selected amounts of water to a selected temperature, preferably about 98 degrees.

As shown in FIG. 1, the heater includes the chamber 30, with the coils 88 therein, which are disposed within the chamber 30 submersion into the selected amount of water. The control means 80, regulates the metering valve 24 by way of an electrical connection 90.

Alternatively, the metering valve 24 may be mechanically driven, by a spring or the like, for dispensing the preselected amount of water and a corresponding signal is sent through the electrical line 90 to the control system for running of the heating coils 88 through a control line as indicated by the dashed line 100.

Subsequent the heating of the selected amount of water in the chamber 30 by the coils 88, the discharge valve outlet 34 may be controlled via the control means and line 102 to dispense the heated water into the liner 40.

An alternative embodiment 110 in accordance with the present invention is shown in FIG. 2, with corresponding elements being given common character references.

In this embodiment 110, the metering valve 24 dispenses one of the selected amounts of water into a section of heated tube 112 for heating of water flowing therethrough to an discharge valve outlet 114. In this instance, sections 120, 122, 124 of the heated tube 112 may be separately controlled by lines 130, 132, 134 connected to the control system 80 for enabling the selected amount of water to be properly heated to the preferred temperature of 98° F. as the water exits the discharge valve outlet 114 into the liner 42 with the baby milk powder therein.

Although there has been hereinabove described a baby milk warmer in accordance with the present invention, the purpose of illustrating the manner in which the invention may be used to advantage, it should be appreciated that the invention is not limited thereto.

Accordingly, any and all modifications, variations, or equivalent arrangements which may occur to those skilled in the art, should be considered to be within the scope of the present invention as defined in the appended claims.

What is claimed is:

1. A baby milk warmer comprising:
   housing means for supporting a bottle of water;
   heating means within said housing means for heating selected amounts of water, said heater means having inlet means for receiving water and outlet means for dispensing heated water;
   flexible tube means connected to said inlet means for interconnecting the bottle to the inlet means;
   metering valve means, disposed between said flexible tube means and said heating means for allowing one of the selected amounts of water to enter the heating means;
   sensor means, disposed in said flexible means upstream from said metering valve means, for sensing the temperature of water entering the metering valve means;
   manual means for designating one of the selected amounts of water; and
   control means, responsive to said sensor means and said manual means, for running the heating means for a sufficient time to warm one of the selected amounts of water to a selected temperature.

2. The baby bottle warmer according to claim 1 wherein the selected amounts of water are 4 ounces, 6 ounces and 8 ounces and the heating means is sized for heating the selected amount of water to 98° F. in 15 seconds, 22-½ seconds and 30 seconds, respectively.

3. The baby bottle warmer according to claim 2 further comprising a plurality of collapsible liners containing 4, 6 and 8 ounce quantities of baby milk powder and at least one plastic cylinder, with a top and nipple, for supporting one of the collapsible liners and receiving a corresponding one of the selected amounts of water.

4. The baby bottle warmer according to claim 3 wherein the manual means comprises an electrical switch.

5. The baby bottle warmer according to claim 4 wherein the heating means comprises a chamber with heating coils therein disposed for submersion in one of the selected amounts of water.

6. The baby bottle warmer according to claim 4 wherein the heating means comprises a section of heated tube for enabling one of the selected amounts of water to flow therethrough.

7. The baby bottle warmer according to claim 5 wherein said bottle comprises a neck portion and said flexible tube means comprises coupling means for connection with said neck portion and a tube of sufficient length to enable the coupling means to be connected to the neck portion while the bottle is in an upright position in order to enable the bottle to be inverted and disposed in the housing means without spillage of water.

8. The baby bottle warmer according to claim 6 wherein said bottle comprises a neck portion and said flexible tube means comprises coupling means for connection with said neck portion and a tube of sufficient length to enable the coupling means to be connected to the neck portion while the bottle is in an upright position in order to enable the bottle to be mounted and disposed in the housing means without spillage of water.

9. A baby milk warmer comprising:
   housing means for supporting a water bottle;
   heating means within said housing means for heating selected amounts of water, said heater means having inlet means for receiving water and outlet means for dispensing heated water;
   metering valve means connected to said inlet means for introducing one of the selected amounts of water into the heating means;
   sensor means upstream of said metering valve means for sensing the temperature of water entering the metering valve means; and
   control means, responsive to said sensor means, for running the heating means for a sufficient time to warm one of the selected amounts of water to a selected temperature.

10. The baby bottle warmer according to claim 9 further comprising a plurality of liner containers 4, 6, and 8 ounce quantities of baby milk powder and at least one cylinder, with a top and nipple, for supporting one of the liners and receiving a corresponding one of the selected amounts of water.

11. The baby bottle warmer according to claim 10 further comprising flexible tube means for interconnecting the water bottle to the inlet means and wherein said sensor means is disposed in the flexible tube means.

* * * * *